US009217649B1

(12) United States Patent
Dror et al.

(10) Patent No.: US 9,217,649 B1
(45) Date of Patent: Dec. 22, 2015

(54) SYSTEMS AND METHODS FOR PROVIDING TOPOGRAPHICAL GRAPHS AND TRAVEL ROUTES BASED ON PERCEIVED EXERTION

(71) Applicant: THE ARIZONA BOARD OF REGENTS ON BEHALF OF THE UNIVERSITY OF ARIZONA, Tucson, AZ (US)

(72) Inventors: Moshe Dror, Tucson, AZ (US); Katherine E. Carl, Tucson, AZ (US)

(73) Assignee: THE ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 14/051,338

(22) Filed: Oct. 10, 2013

Related U.S. Application Data

(60) Provisional application No. 61/795,174, filed on Oct. 11, 2012.

(51) Int. Cl.
  G01C 21/34 (2006.01)
  G01C 21/00 (2006.01)
  G01C 21/32 (2006.01)
  G01C 21/20 (2006.01)
  G01C 21/36 (2006.01)

(52) U.S. Cl.
  CPC ............ *G01C 21/3484* (2013.01); *G01C 21/00* (2013.01); *G01C 21/20* (2013.01); *G01C 21/32* (2013.01); *G01C 21/34* (2013.01); *G01C 21/3617* (2013.01); *G01C 21/3641* (2013.01)

(58) Field of Classification Search
  None
  See application file for complete search history.

(56) References Cited

U.S. PATENT DOCUMENTS

| | | | | |
|---|---|---|---|---|
| 6,856,897 | B1 * | 2/2005 | Phuyal et al. | 701/461 |
| 7,788,026 | B2 | 8/2010 | Mueller | 701/201 |
| 2006/0281062 | A1 * | 12/2006 | Tucker | 434/255 |
| 2008/0182723 | A1 * | 7/2008 | Aaron et al. | 482/8 |
| 2008/0208459 | A1 * | 8/2008 | Takahata et al. | 701/208 |
| 2010/0210421 | A1 * | 8/2010 | Case et al. | 482/8 |
| 2011/0035184 | A1 * | 2/2011 | Aaron et al. | 702/158 |
| 2012/0259541 | A1 * | 10/2012 | Downey et al. | 701/433 |
| 2014/0303892 | A1 * | 10/2014 | Morlock | 701/533 |

OTHER PUBLICATIONS

Carl et al., "GIS-based Construction of a Topographical Road Graph for Bicycle Tour Routes," Aug. 20, 2013 (15 pgs).

(Continued)

*Primary Examiner* — John R Olszewski
*Assistant Examiner* — Jeffrey Boomer
(74) *Attorney, Agent, or Firm* — Lewis Roca Rothgerber LLP

(57) ABSTRACT

Systems and methods for providing a topographical graph are provided. A computer-implemented method for providing a topographical graph includes accessing, by a computer processor, road map data associated with a geographic area, and accessing, by the computer processor, elevation data associated with the geographic area. The computer processor references the elevation data to determine points at which there is a change in incline along roads in the geographic area. The topographical graph is constructed, with the points defining nodes in the topographical graph, and arcs between the nodes representing road segments having a substantially constant degree of incline. Further provided are methods for determining levels of perceived exertion in traversing arcs, and for optimizing travel routes for minimal perceived exertion.

17 Claims, 7 Drawing Sheets

(56) References Cited

OTHER PUBLICATIONS

Ahuja et al., "Network flows: theory, algorithms, and applications," Prentice Hall, 1993, Business & Economics, book summary only (1 pg).

Speicys et al., "Enabling Location-based Services—Multi-Graph Representation of Transportation Networks," Geoinformatica, 2008, vol. 12, pp. 219-253 (35 pgs).

Wilkie et al., "Transforming GIS Data into Functional Road Models for Large-Scale Traffic Simulation," IEEE Transactions on Visualization and Computer Graphics, Sep./Oct. 2010, vol. 16, No. 5, pp. 1-14 (14 pgs).

Summerson, J., "The Complete Guide to Climbing (by Bike)," Brigham Distributing: $1^{st}$ edition, Jul. 1, 2007, book summary only (5 pgs).

Borg, G.A., "Perceived exertion: a note on "history" and methods," Medicine and Science in Sports, 1973, vol. 5, No. 2, pp. 90-93 (4 pgs).

Morgan, W.P., "Psychological factors influencing perceived exertion," Medicine and Science in Sports, 1973, vol. 5, No. 2, pp. 97-103 (7 pgs).

Skinner et al., "The validity and reliability of a rating scale of perceived exertion," Medicine and Science in Sports, 1973, vol. 5, No. 2, pp. 94-96 (3 pgs).

Ghose et al., "A GIS based transportation model for solid waste disposal—A case study on Asansol municipality," Waste Management, 2006, vol. 26, pp. 1287-1293 (7 pgs).

Dean, D.J., "Finding optimal routes for networks of harvest site access roads using GIS-based techniques," Can. J. For. Res., 1997, vol. 27, pp. 11-22 (12 pgs).

Olivera et al., "Geographic information systems (GIS)-based spatially distributed model for runoff routing," Water Resources Research, Apr. 1999, vol. 35, No. 4, pp. 1155-1164 (10 pgs).

\* cited by examiner

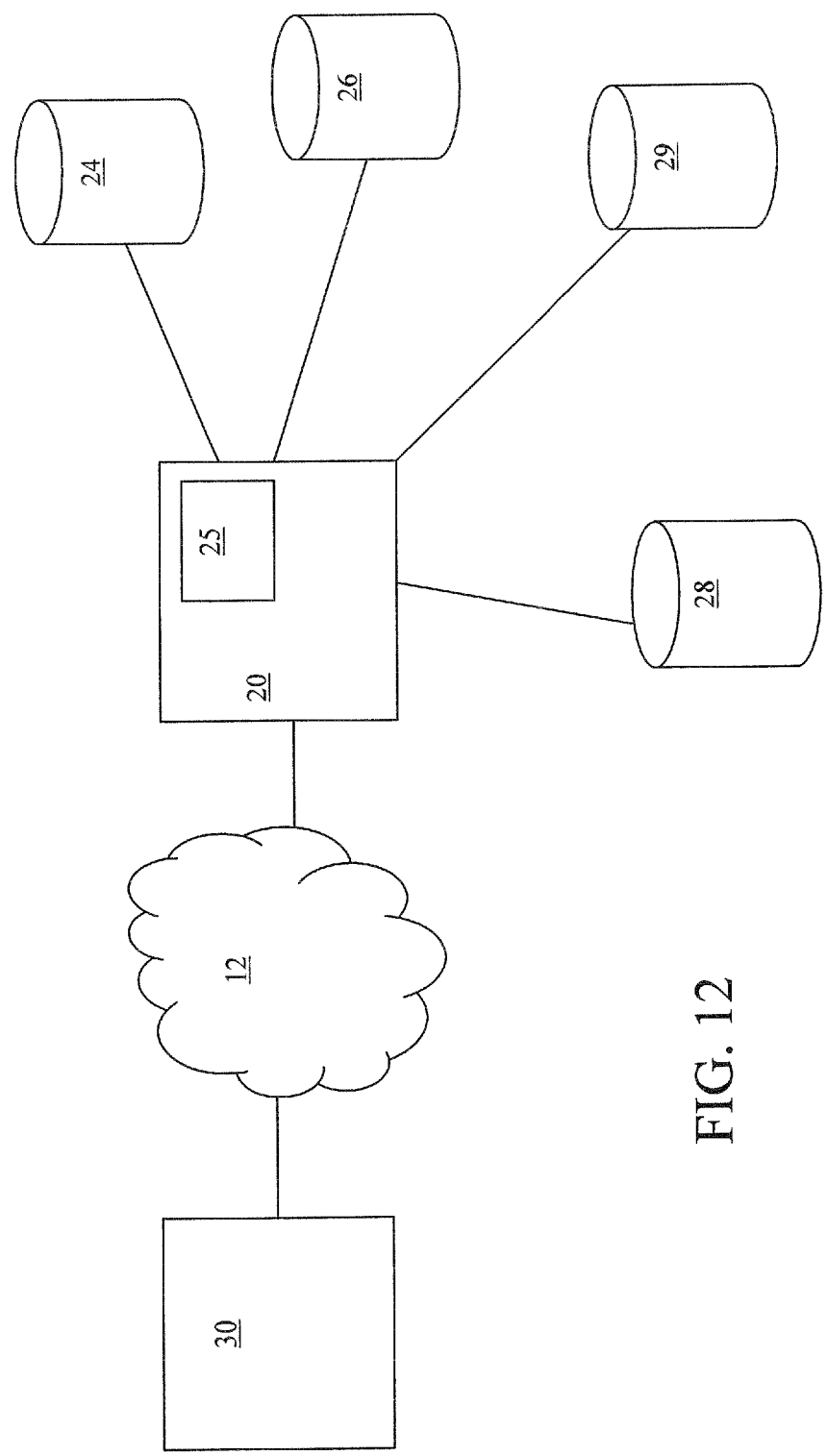

SYSTEMS AND METHODS FOR PROVIDING TOPOGRAPHICAL GRAPHS AND TRAVEL ROUTES BASED ON PERCEIVED EXERTION

CROSS REFERENCE TO RELATED APPLICATION

This application claims priority from U.S. Provisional Application Ser. No. 61/795,174, filed Oct. 11, 2012, the contents of which are incorporated herein in their entirety.

STATEMENT OF GOVERNMENT INTEREST

This invention was made with Government support under Grant No. DTFH64-12-G-00032 awarded by DOT-FHA. The Government has certain rights in the invention.

FIELD OF THE DISCLOSURE

The present disclosure is generally related to topographical graphs and route planning, and more particularly is related to systems and methods for providing topographical graphs indicating points of changing incline, and perceived exertion in traversing segments of maps or topographical graphs.

BACKGROUND OF THE DISCLOSURE

Long distance multi-day bicycle tours are a highly popular form of exercise and recreation among a fast-growing population of cyclists. Navigation tools that assist multiday bicycle tour planning or generate small-scale bicycle routes are known, but lack the essential services needed to construct customized long distance bicycle tour routes. Further, while network representations of the road and other map features are widely used in mapping applications and route planning, few (if any) are tailored to the needs of bicyclists traveling long distances. Elevation can be added to road network data to calculate slope and produce maps and routing applications for cyclists interested in road gradient, but elevation and grade alone are not sufficient to construct multi-day tours customized to different levels of riding expertise.

Routing applications require the use of graphs to represent road network structure. The traditional representation of a road map uses nodes in the graph to represent road intersections and edges or arcs to represent the sections of road between intersections. Several well-known network flow problems that use graph representations are discussed by Ahuja et al., including the shortest path, maximum flow, minimum cost flow, and multicommodity flow problems. Ahuja, R. K., Magnanti, T. L., and Orlin, J. B. (1993). Network Flows: Theory, Algorithms, and Applications. Prentice Hall, Inc. Graph representations of roads have been used in GIS-based routing for a variety of applications, including modeling water runoff, choosing optimal roads to reach timber stands in forests, and routing the collection of solid waste in India. Extensions and manipulations to the traditional road graph model have also been made in GIS applications in order to capture road topology. Speičys and Jensen developed a graph representation of a road network that combines a two-dimensional representation of roads with a multi-graph presentation that simultaneously captures the details of road features and allows for routing. Speičys, L. and Jensen, C. S. (2008). Enabling location-based services-multi-graph representation of transportation networks. *GeoInformatica*, 12(2): 219-253. Wilkie et al. created a lane-centric graph representation of roads to produce large-scale traffic simulations. Wilkie, D., Sewall, J., and Lin, M. C. (2011). Transforming GIS data into functional road models for large-scale traffic simulation. *IEEE Transactions on Visualization and Computer Graphics*, 16(5).

In order to capture land features accurately, the OpenStreetMap (OSM) dataset uses nodes, ways, and relations to represent points, lines, and polygons on the map. This representation presents a challenge for routing. However, tags within the OSM database indicate road location and type (e.g., 'oneway=yes', 'highway=motorway') and enable routing within the map.

The International Mountain Bicycling Association (IMBA), *The Complete Guide to Climbing (by Bike)*, and ClimbByBike.com each offer a method of classifying the difficulty of a bicycle path. The rating system used by the IMBA uses percent grade incline to categorize path difficulty and defines five levels of difficulty ranging from the least difficult 'white circle' to the extremely difficult 'double black diamond.' The easiest level has an average percent grade incline of less than 5% and a maximum grade of 10%, while the hardest level has an average percent grade incline of 15% or more and a maximum percent grade of 20% or greater. This method can be used by cyclists as a general guide for existing bicycle trails. Another system of calculating path difficulty is described by Summerson, in *The Complete Guide to Climbing* (by Bike) (2007). While this method is more sophisticated than the one defined by the IMBA, it can only be used to calculate the difficulty of climbs, or paths with percent grade incline of 0% or greater. In Summerson's model, the difficulty of a path is the product of the square root of the average grade, the total elevation gain, the altitude adjustment, the surface adjustment, and grade variability. The altitude adjustment increases the difficulty of paths above 2000 feet elevation under the assumption that performance decreases noticeably at that elevation and above. Surface adjustment is found by calculating the percentage of the climb that is non-paved and multiplying that by 0.25, assuming that unpaved surfaces are 25% more difficult to ride on than paved surfaces. Finally, the grade variability adjustment increases the path rating by 0.025 if it has two or more segments where the grade of the segment is larger than the average percent grade of the climb by five or more percentage points. However, Summerson's model cannot be used to calculate the difficulty of the example path shown in FIG. 1, as it has sections of road less than 0% grade in incline.

Yet another method used to calculate the difficulty of a path is given by equation (1) below. This method, shown on ClimbByBike.com, considers similar factors.

$$\frac{H}{25L} + \frac{H^2}{L} + \frac{L}{1000} + \frac{T-1000}{100} \tag{1}$$

$$\frac{962.28}{25(26466)} + \frac{962.28^2}{26466} + \frac{26466}{1000} + \frac{1062.28-1000}{100} = 62.08 \tag{2}$$

In this model, H represents the total elevation gain, L represents the length of climb, and T represents the elevation at the highest point of the path. The difficulty of the path in FIG. 1 can be calculated using this method as shown in (2). However, it is not clear how the output values of this method scale to paths of higher and lower difficulty, and the formula does not adjust difficulty for different categories of cyclists.

Of the existing methods used to calculate the difficulty of a path, one of the more popular methods is based on the total elevation gain, as climbing is often considered the most challenging aspect of cycling. Consider the path shown in FIG. 1.

On this path, cyclists would experience a total elevation gain of 671.22 feet and reach a maximum elevation of 871.22 feet. Using elevation gain alone as a measure, this path would be labeled with a high difficulty rating. However, cyclists riding on this path would also experience two sections during the climb with 0% grade and travel downhill after the climb, which would allow them to recover and mitigate the perceived difficulty of the path. As demonstrated by this path example, elevation gain of a route alone may not be an appropriate evaluation criterion for path difficulty.

While the present disclosure describes many of the systems and methods provided herein with respect to cycling, the concepts are equally applicable, and indeed intended specifically to apply to, other modes of travel which may cause perceived exertion, including but not limited to, hiking, jogging, cross-country skiing, and so on.

SUMMARY OF THE DISCLOSURE

Embodiments of the present disclosure provide a computer-implemented method for providing a topographical graph. Briefly described, one embodiment of the method, among others, can be implemented as follows. A computer-implemented method for providing a topographical graph includes the steps of: accessing, by a computer processor, road map data associated with a geographic area; accessing, by the computer processor, elevation data associated with the geographic area; referencing the elevation data to determine, by the computer processor, points at which there is a change in incline along roads in the geographic area; and constructing the topographical graph, with the points defining nodes in the topographical graph, and arcs between the nodes representing road segments having a substantially constant degree of incline.

In another embodiment, a system for providing a topographical graph is provided. The system includes a computerized device hosting a topographical graph application. The topographical graph application is configured to: access a road map database having road map data associated with a geographic area; access an elevation database having elevation data associated with the geographic area; reference the elevation data to determine points at which there is a change in incline along roads in the geographic area; and construct the topographical graph, with the points defining nodes in the topographical graph, and arcs between the nodes representing traversable road segments having a substantially constant degree of incline.

In another embodiment, a non-transitory computer readable medium containing instructions for providing a method for providing a topographical graph enabled at least in part on a processor of a computerized device is provided. A road map database is electronically accessible by the processor, the road map database storing road map data associated with a geographic area, and an elevation database is electronically accessible by the processor, the elevation database storing elevation data associated with the geographic area. The instructions, which when executed by the processor, perform the steps of: referencing the elevation data to determine points at which there is a change in incline along roads in the geographic area; and constructing the topographical graph, with the points defining nodes in the topographical graph, and arcs between the nodes representing traversable road segments having a substantially constant degree of incline.

In still another embodiment, the present disclosure provides a computer-implemented method of determining a level of perceived exertion in traversing a travel path by a traveler having a particular level of skill in a mode of travel, wherein the travel path comprises at least one arc, and the at least one arc comprises one or more consecutive elementary pieces, each elementary piece of an arc having a substantially same degree of incline. The method includes the steps of: determining, for each elementary piece of an arc, a level of perceived exertion based on: an average amount of time persons having the traveler's skill level take to traverse the elementary piece; a weight of the elementary piece, based on the degree of incline and the traveler's skill level; and the position of the elementary piece in an ordered set of consecutive elementary pieces making up the arc; determining, for each arc of the path, a level of perceived exertion by summing the determined levels of perceived exertion for the elementary pieces of the arc; and summing the level of perceived exertion for the arcs of the travel path.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 12 is a schematic illustration of a system for providing a topographical graph, in accordance with an embodiment provided by the present disclosure.

DETAILED DESCRIPTION

Figure 1:
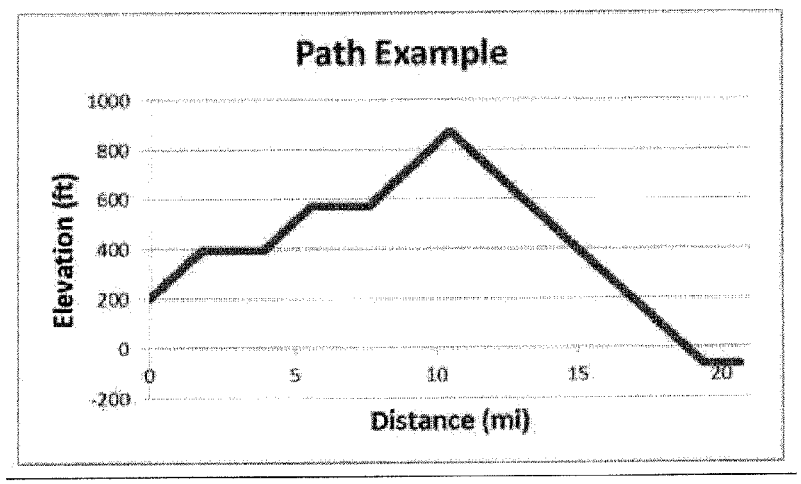
FIG. 1 is an illustration of an example path, which highlights deficiencies of the prior art.

Many embodiments of the disclosure may take the form of computer-executable instructions, including algorithms executed by a programmable computer. However, the disclosure can be practiced with other computer system configurations as well. Certain aspects of the disclosure can be embodied in a special-purpose computer or data processor that is specifically programmed, configured or constructed to perform one or more of the computer-executable algorithms described below. Accordingly, the term "computer" as generally used herein refers to any data processor and includes Internet appliances, hand-held devices (including palm-top computers, wearable computers, cellular or mobile phones, multi-processor systems, processor-based or programmable consumer electronics, network computers, minicomputers) and the like.

The disclosure also can be practiced in distributed computing environments, where tasks or modules are performed by remote processing devices that are linked through a communications network. Moreover, the disclosure can be practiced in Internet-based or cloud computing environments, where shared resources, software and information may be provided to computers and other devices on demand. In a distributed computing environment, program modules or subroutines may be located in both local and remote memory storage devices. Aspects of the disclosure described below may be stored or distributed on computer-readable media, including magnetic and optically readable and removable computer disks, fixed magnetic disks, floppy disk drive, optical disk drive, magneto-optical disk drive, magnetic tape, hard-disk drive (HDD), solid state drive (SSD), compact flash or non-volatile memory, as well as distributed electronically over networks including the cloud. Data structures and transmissions of data particular to aspects of the disclosure are also encompassed within the scope of the disclosure.

Topographical Graph Construction

FIGS. 2-11 illustrate a method of constructing a topographical graph, in accordance with an exemplary embodiment provided by this disclosure. The topographical graph may be constructed using data associated with any map showing distances (e.g., a two-dimensional road or street map, such as provided by the OSM dataset) and elevation data (e.g., the Digital Elevation Model provided by the U.S. Geological Survey). The digital road network in the OSM dataset is defined as a directed graph $G=(V, A)$. The set V is a finite set of nodes in which every $v \in V$ represents a point on a road in the United States (or any other geographic area). The set A is a finite set of arcs where every arc $a=(v, u) \in A$ connects two nodes u and v. In addition, there is a set W that is a finite set of ways or open polylines in which every way $w \in W$ is an ordered collection of k arcs $\{(u_1, v_1), \ldots, (u_k, v_k)\}$. Every node $v \in V$ is included in one or more ways $w \in W$ and when two ways $w_1$, $w_2$ contain the same node v, they and their corresponding roads in the map intersect at node v.

A topographical graph may be defined as a directed graph $\tilde{G}=(\tilde{V}, \tilde{A})$ representative of a road map (or other normally two-dimensional map) that, in addition to its usual attribute of distance for each arc, also has an attribute of perceived exertion (PE) for each arc. The set $\tilde{V}$ is a finite set of nodes in which every $v \in \tilde{V}$ represents a point on a physical road segment at which there is a change in percent grade incline and an arc $a=(v, u) \in \tilde{A}$ is defined as a road segment of constant percent grade incline between two nodes v, $u \in \tilde{V}$. During the transformation, information from a given topographical map (or map having associated elevation information) is imposed upon the digital road network as described below. The resulting map, the graph $\tilde{G}$, is a representation of the available traversal options as measured by the values of PE, in addition to the usual road distance on the original physical roads.

Intersection Case Analysis

When traversing the arcs in the digital road network, G, it is possible to encounter several different types of intersections with various slope characteristics. Most possible cases are analyzed below and it is demonstrated how a topographical graph, $\tilde{G}$, is constructed in each case using the graph transformation algorithm provided herein. In each example, a digital road network representation G' is pictured on the left and the topographical graph $\tilde{G}'$ is pictured on the right. Additionally, traversing an arc in the direction opposite to that shown in each Figure implies that a traveler (e.g., a cyclist) traversing the arc in that direction experiences the opposite percent grade incline. For example, if an arc has 2% grade in one direction, it has −2% grade in the opposite direction.

Figure 2:
FIG. 2 illustrates the transformation of a digital road network into a topographical graph by presenting Case 0 (of multiple potential cases), in accordance with a first exemplary embodiment provided by the disclosure.

Case 0 (Shown in FIG. 2):

The digital road network is transformed into a topographical graph by determining where there are changes in percent grade incline along each road and creating corresponding locations for each node in $\tilde{V}$. Starting at node $V_1$ in the digital road network, the arc $(v_1, v_2)$ is traversed until reaching either (1) a point, p, at which the percent grade incline of the road changes, or (2) $v_2$. If a point, p, is reached at which the percent grade incline of the road changes, as shown in FIG. 2, the node p is added to $\tilde{V}(\tilde{V}:=\tilde{V} \cup \{p\})$ and arc $(v_1, p)$ is added to $\tilde{A}(\tilde{A}:=\tilde{A} \cup (v_1, p))$ in the topographical graph, $\tilde{G}$. After adding p to $\tilde{V}$, traversal of the digital road network arc $(v_1, v_2)$ is continued from point p until either reaching another point p at which the percent grade incline changes, or reaching $v_2$. If $v_2$ is reached, there are no other points at which the percent grade incline changes along $(v_1, v_2)$. Node $v_2$ may be one of several different cases of intersections. When reaching node $v_2$, it must be determined whether or not the percent grade incline at $v_2$ changes on any incident arc. If the percent grade incline changes on any arc in the digital road network incident to $v_2$, $v_2$ is added to $\tilde{V}$ and $(p, v_2)$ is added to $\tilde{A}$ in the topographical graph. Several of the possible cases that may occur when encountering an intersection are presented and discussed below.

Figure 3:
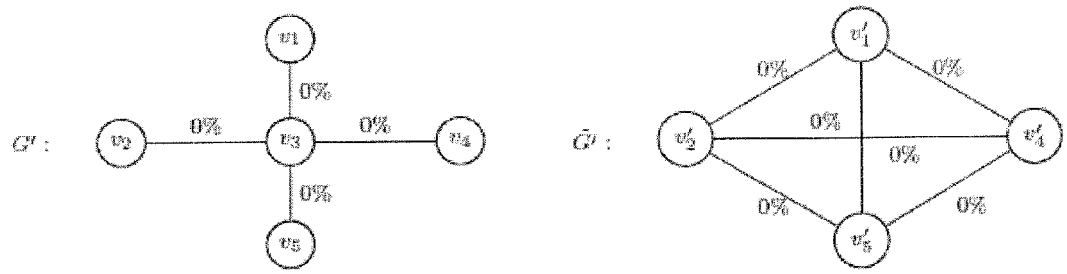
FIG. 3 illustrates the transformation of a digital road network into a topographical graph by presenting Case 1 (of multiple potential cases), in accordance with an embodiment provided by the disclosure.
Figure 4:
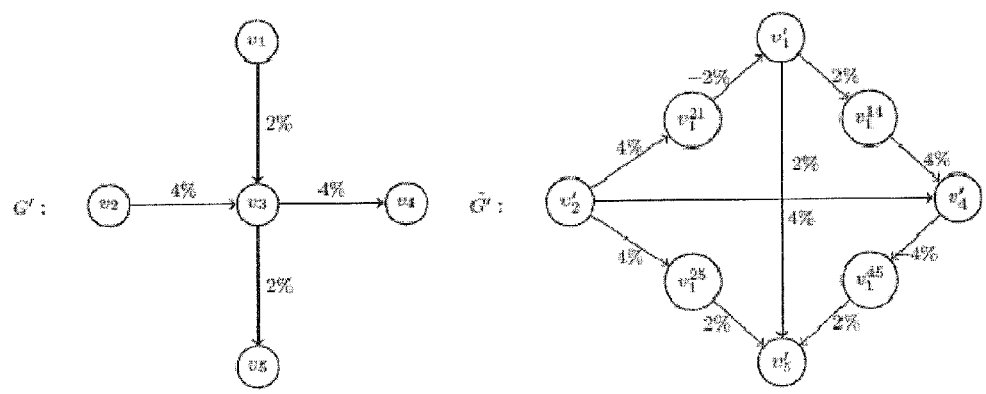
FIG. 4 illustrates the transformation of a digital road network into a topographical graph by presenting Case 2 (of multiple potential cases), in accordance with an embodiment provided by the disclosure.

Case 1 (FIG. 3):

In case 1, shown in FIG. 3, the percent grade incline remains the same on each arc in each direction from the physical intersection $v_3$. During the transformation, node $v_3$ is not included in the topographical graph, as it is not a point at which the percent grade incline changes. $\tilde{G}'=(\tilde{A}', \tilde{V}')$ with $\tilde{V}':=V'\setminus\{v_3\}$. Case 1 illustrates the resulting topographical graph created when node $v_3$ in the digital road network is encountered from any other node incident to $v_3$ in V and the percent grade incline along all arcs incident to $v_3$ does not change. In the next cases presented, the percent grade incline along incident arcs may not be equal.

Case 2 (FIG. 4):

In this case, the percent grade incline remains the same for each road running north-south and east-west through the intersection. When node $v_4$ is reached by starting at node $v_2$ and traveling through node $v_3$, the percent grade incline does not change. Arc $(v_2, v_4)$ may be included in the topographical graph if there is a change in incline at node $v_4$, but node $v_3$ is not included in the resulting graph. However, when node $v_4$ is reached by starting at node $v_1$ and traveling through node $v_3$, the percent grade incline changes, and arcs $(v_1, v_3)$ and $(v_3, v_4)$, as well as node $v_3$, are included in the topographical graph.

Figure 5:
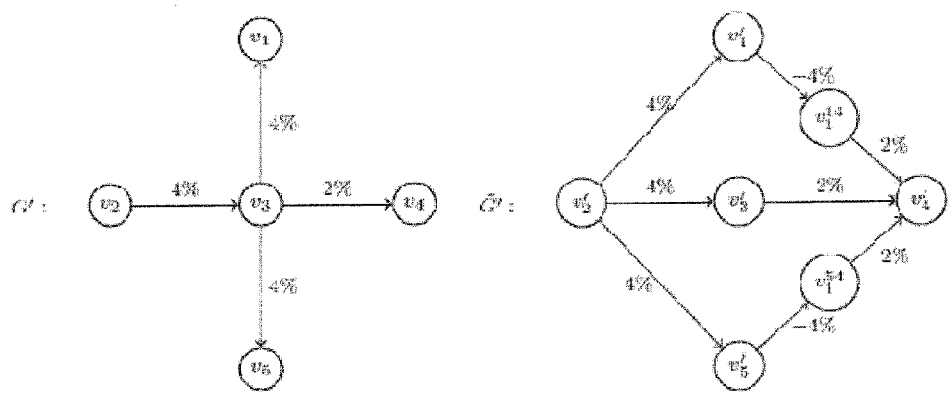
FIG. 5 illustrates the transformation of a digital road network into a topographical graph by presenting Case 3 (of multiple potential cases), in accordance with an embodiment provided by the disclosure.

Case 3 (FIG. 5):

In case 3, shown in FIG. 5, there are three arcs with the same percent grade incline and one arc with a different percent grade incline from the other three. The arcs with the same grade have the same grade when coming from the arc with the different percent grade. When node $v_5$ is reached by starting at node $v_2$ and traveling through $v_3$, the percent grade incline does not change, and node $v_3$ is not included in the topographical graph. However, when node $v_5$ is reached by starting at node $v_4$ and traveling through $v_3$, the percent grade incline changes and $v_3$ and arcs $(v_4, v_3)$ and $(v_3, v_5)$ are included in the resulting graph.

Figure 6:
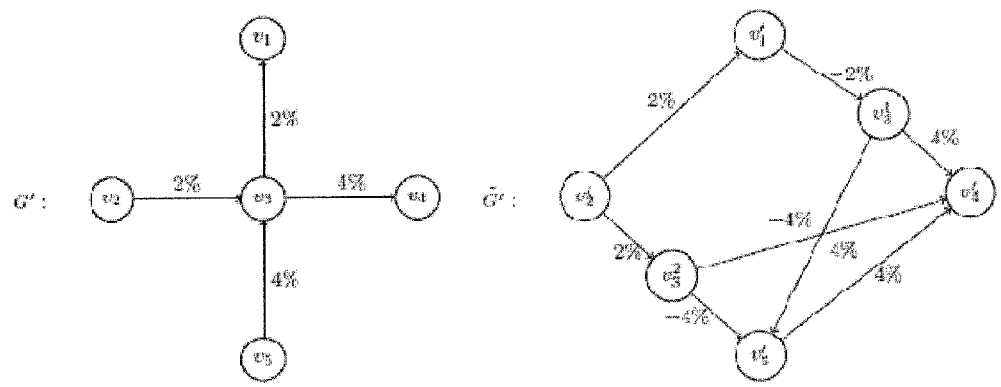
FIG. 6 illustrates the transformation of a digital road network into a topographical graph by presenting Case 4 (of multiple potential cases), in accordance with an embodiment provided by the disclosure.

Case 4 (FIG. 6):

In this case, shown in FIG. 6, there are two sets of arcs with identical percent grade incline. As the percent grade incline traveling through node $v_3$ from node $v_1$ to node $v_2$ remains the same, node $v_3$ is not included in the topographical graph. However, when node $v_5$ is reached by traveling through node $v_3$ from node $v_1$, node $v_3$ as well as arcs $(v_1, v_3)$ and $(v_3, v_5)$ are included in the resulting graph.

Figure 7:
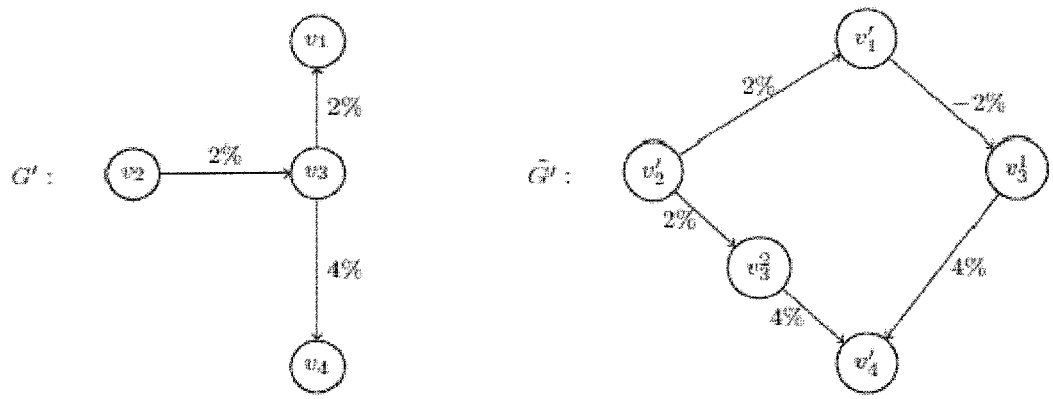
FIG. 7 illustrates the transformation of a digital road network into a topographical graph by presenting Case 5 (of multiple potential cases), in accordance with an embodiment provided by the disclosure.

Case 5 (FIG. 7):

In this case, shown in FIG. 7, there is a fork in the road and the percent grade incline remains the same when traveling in one direction at the fork. As a result, when traveling from node $v_1$ to node $v_4$ via node $v_3$, the percent grade incline does not change, and node $v_3$ is not included in the topographical graph. However, when traveling from node $v_2$ to node $v_4$ via node $v_3$, the percent grade incline changes, and node $v_3$ as well as arcs $(v_2, v_3)$ and $(v_3, v_4)$ are added to the resulting graph.

Figure 8:
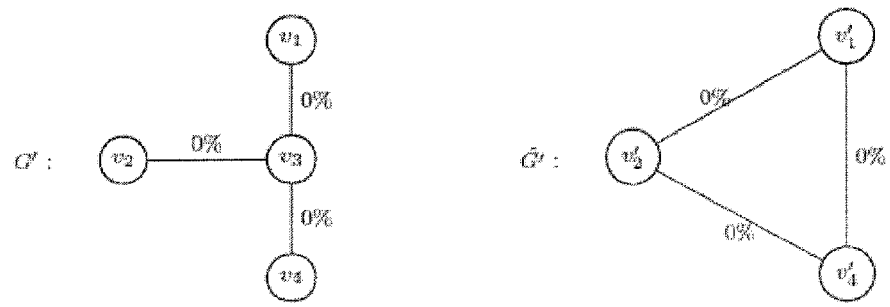
FIG. 8 illustrates the transformation of a digital road network into a topographical graph by presenting Case 6 (of multiple potential cases), in accordance with an embodiment provided by the disclosure.

Case 6 (FIG. 8):

In case 6, shown in FIG. 8, there is a fork in the road and the percent grade incline is equal in all directions. When traveling from any node to any other node via node $v_3$, the percent grade incline does not change, and $v_3$ is not included in the resulting topographical graph.

Figure 9:
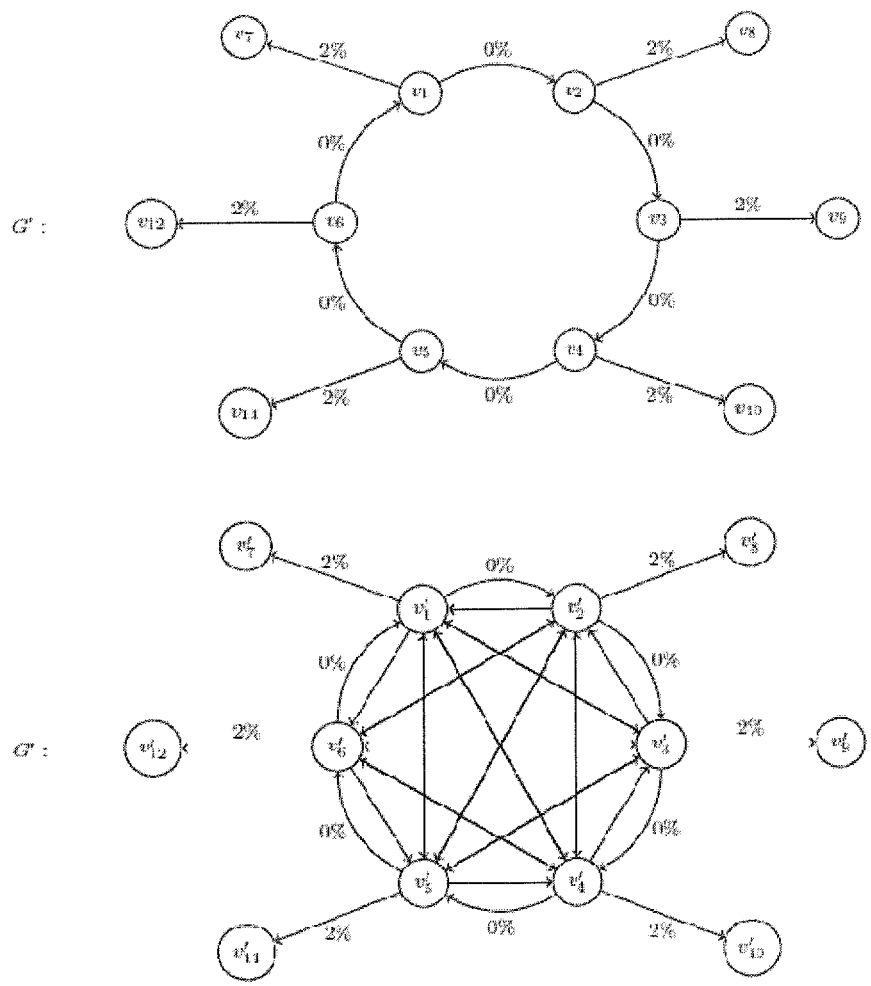
FIG. 9 illustrates the transformation of a digital road network into a topographical graph by presenting Case 7 (of multiple potential cases), in accordance with an embodiment provided by the disclosure.

Case 7 (FIG. 9):

In this case, shown in FIG. 9, there is a roundabout with six exits in which the percent grade incline stays constant within the roundabout, but changes leaving each exit. The resulting topographical graph contains a complete subgraph on the nodes representing exits of the roundabout, where all arcs within the subgraph have percent grade incline equal to the percent grade incline along the roundabout (0% in this case).

Now that several of the exemplary cases which may be encountered when reaching an intersection have been presented, a summary of the algorithm and process used to construct a topographical graph from the digital road network will be presented and illustrated with an example.

Implementation

To construct a topographical graph using the digital road network, data associated with a two-dimensional road map of a geographic area (or any dataset or map indicating location or distances between points over any geographic area, e.g., the OSM dataset) with reference to corresponding elevation map data (e.g., the DEM provided by the U.S. Geological Survey) to determine where there are changes in incline along any physical road segment. The transformation of G to $\tilde{G}$, the topographical graph, begins at a node v in the digital road network, which is traversed along an incident arc (v, u) until reaching either (1) a point, p, at which the percent grade incline changes, or (2) node u. Each time the percent grade incline changes, the point at which it changes, p, is added and appropriately labeled as a node in the topographical graph, and the arc incident to it, (v, p), is added as an arc in the topographical graph. When an intersection in the digital road network is reached, one of several cases may occur, as demonstrated above. Depending upon the case, the nodes and arcs added to the topographical graph may vary. However, arcs will only be added (and appropriately labeled) to the topographical graph if they begin and end at points at which the percent grade incline changes.

Traversal of the digital road network G and its transformation into the corresponding topographical graph $\tilde{G}$ terminates when all nodes in G have been visited.

Figure 10:
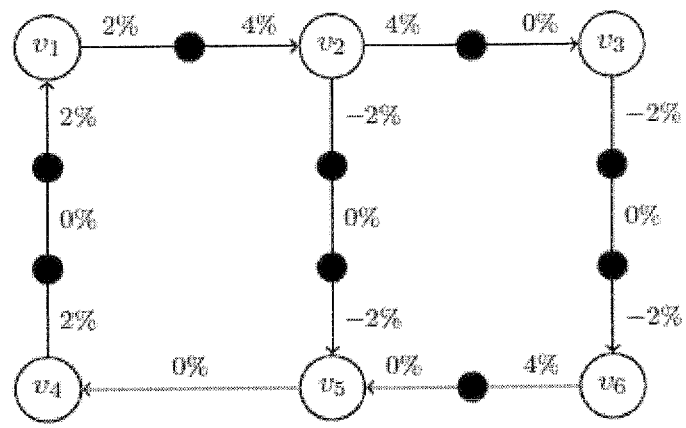
FIG. 10 illustrates an example digital road network which may be transformed into a topographical graph, in accordance with an embodiment provided by the disclosure.
Figure 11:
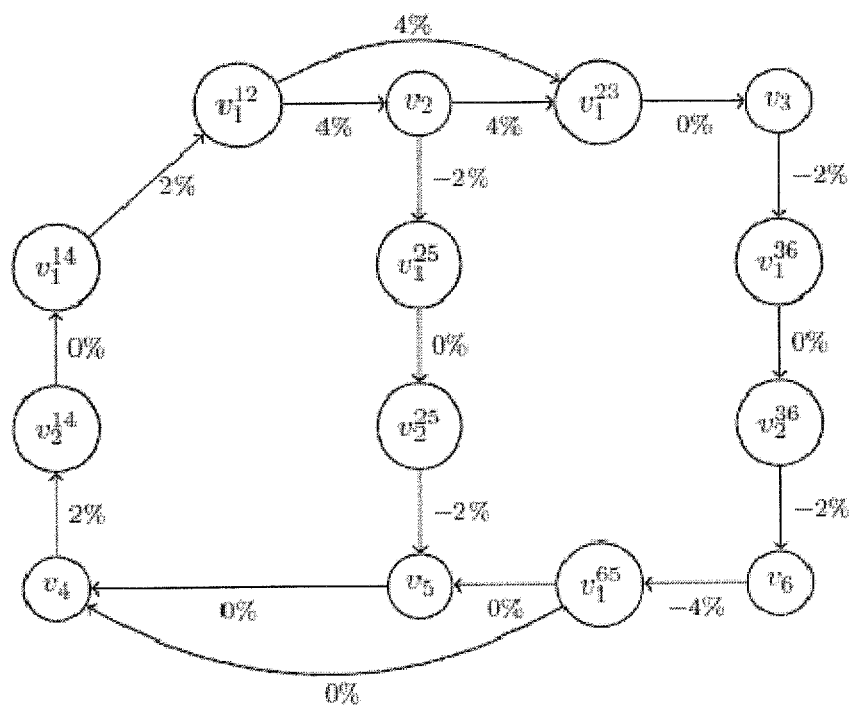
FIG. 11 illustrates an example topographical graph, formed by transforming the digital road network of FIG. 10, in accordance with an embodiment provided by the disclosure.

Graph Transformation Example (FIGS. 10 and 11):

Using the process described above, an example digital road network (shown in FIG. 10) is transformed into a topographical graph (shown in FIG. 11). Consider G=(V, A) with six nodes as shown in FIG. 10. Using this data, the percent grade incline along each arc in G can be calculated and used to construct a topographical graph, $\tilde{G}$. For example, arc $(v_1, v_2) \in G$ is 264 feet in length and contains 8 elementary pieces of 33 feet in length each. The first 4 consecutive elementary pieces traveling from $v_1$ to $v_2$ have 2 percent grade incline and the last 4 consecutive elementary pieces have 4 percent grade incline. Each arc in the digital road network G has known elevation data at the start and end of each elementary piece.

Starting at node $v_1$, a topographical graph is constructing using the method described above. Arc $(v_1, v_2)$ is traversed incident to $v_1$ until either the percent grade incline changes or node $v_2$ is reached. In this case, the percent grade incline changes at the start of the fifth elementary piece within the digital road network arc. A node is thus added to the topographical graph, $\tilde{G}$ to represent this change in incline and traversal of the arc $(v_1, v_2)$ is continued until either the percent grade incline changes again or the node $v_2$ is reached. The percent grade incline does not change before reaching node $v_2$. At node $v_2$, each incident arc is examined. Because the percent grade incline changes immediately on arc $(v_2, v_5)$, a node is added at $v_2$ in the vertex set of the topographical graph, and arc $(v_1^{12}, v_2)$ is added to the set of arcs in the topographical graph. At the beginning of arc $(v_2, v_3)$ the percent grade incline does not change. Before using $v_2$ as the new starting node, arc $(v_1, v_4)$ is traversed. Arc $(v_1, v_4)$ is comprised of 15 elementary pieces and is 495 feet in length. There are two points at which the percent grade incline along this arc changes. The first five elementary pieces of arc $(v_1, v_4)$ are −2% grade, the second five elementary pieces are 0% grade, and the last five elementary pieces are −2% grade. The arc is traversed until reaching the point at which the percent grade incline changes along the arc to 0% grade. Because the section of 2% grade along this arc came directly after another section of 2% grade on arc $(v_1, v_2)$ and there are no other arcs incident to $v_1$, $v_1$ is not included in the topographical graph, but a new arc of −2% grade is created from node $v_1^{12}$ to node $v_1^{14}$. Another node, $v_2^{14}$ is added to the vertex set in the topographical graph at the point at which the percent grade incline changes from 0% to −2%. Once node $v_4$ is reached, it is determined whether or not the percent grade incline changes along any incident arcs. As the percent grade incline changes along arc $(v_4, v_5)$, node $v_4$ and arc $(v_2^{14}, v_4)$ are added to the topographical graph. This process is repeated until all nodes in the digital road network have been visited. The results of this exemplary process are shown in FIG. 11.

Additionally, various points of interest may be added to the constructed topographical graph, for example, known locations of rest stops, overnight accommodations and/or potential points of interest to travelers.

Perceived Exertion

Perceived exertion (PE) is defined as the psychological perception of effort and is related to actual work performed. The construct of PE was first described by Borg (Borg, G. A. V. (1973). Perceived exertion: a note on "history" and methods. *Medicine and Science in Sports*, 5(2):90-93) and was validated as a reliable method of measuring differences in perception of work load by Morgan (Morgan, W. P. (1973). Psychological factors influencing perceived exertion. *Medicine and Science in Sports*, 5(2):97-103) and Skinner (Skinner, J. S., Hustler, R., Bergsteinova, V., and Buskirk, E. R. (1973). The validity and reliability of a rating scale of perceived exertion. *Medicine and Science in Sports*, 5(2):94-96.). Unlike the known measures employed for measuring path difficulty (some of which are noted in the background section of this disclosure), PE is related to both work performed and the characteristics of the person performing the work. Thus, when measuring PE in the context of bicycling, both the technical aspects of a path and cyclists' characteristics must be considered. Cyclists' PE of a path is related to both the percent grade incline of its component parts and riders' level of expertise, for example, as defined by USA Cycling. Similarly, the PE of a path for other forms of travel (e.g., hiking) is related to percent grade incline, as well as skill or expertise level of the traveler.

PE of a path is calculated as the sum of the PE of its component parts. The component parts of the exemplary model provided herein are shown in Table 1.

TABLE 1

Tour Route Schema

| Component | Description |
| --- | --- |
| Elementary Piece | a segment 33 feet in length |
| Arc | segment between two nodes |
| Path (Daily Leg) | 50-90 miles between overnight accommodations |

A directed graph $G=(V, A)$ is considered to be a representation of the roads (or traversable paths) of any geographic area (e.g., the United States), where the set $\{V=V_1 \cup V_2\}$ is a finite set of nodes in which every $v \in V_1$ represents a location where there is a change in percent grade incline, and every $v \in V_2$ represents a potential rest stop, overnight accommodation or other point of interest. An arc (v, u) is defined as a road segment between two nodes v, $u \in V$ from v to u. For two consecutive path arcs $(v_1, u_1), (v_2, u_2)$ it implies that $u_1 \equiv v_2$. As shown in Table 1, a daily path is composed of consecutive arcs, which are in turn composed of consecutive elementary pieces of the same percent grade incline for each individual arc. An elementary piece is a segment of road 33 feet in length, and is considered to be the smallest component part/element in our road details. The length of an elementary piece may be dependent on the resolution of available road map data and thus, smaller components may be utilized where available. Levels of PE are calculated for each component part of a path as described below.

Perceived Exertion of an Elementary Piece:

The PE, h(b), of an elementary piece b is calculated using three factors: (1) the average time it takes a traveler of a particular skill level (e.g., a cyclist of a given USA Cycling category l, (l=1, . . . , 5)) to traverse the elementary piece based on its percent grade incline, (2) the weight of the elementary piece as tied to its percent grade incline, and (3) the position of the elementary piece in an ordered set of consecutive elementary pieces of the same percent grade.

The PE of an $n^{th}$ elementary piece of a given percent grade in an arc composed of n elementary pieces may be determined using its traversal time $t_l(b)$, its initial weight $w_l(b)$, its weight adjustment $a_l(b)$, and its position (n−1) within an ordered set of consecutive elementary pieces of the same percent grade as follows:

$$h_l(b) = t_l(b) \times w_l(b) + (n-1) \times a_l(b),$$

where l=skill level (e.g., 1 through 5, in the case of USA Cycling categories).

Travelers (e.g., cyclists, hikers, etc.) having different levels of expertise will take different amounts of time to travel distances (e.g., elementary pieces) having different amounts of incline. The amount of time for travelers of different levels of expertise to travel elementary pieces having differing percent grade inclines (i.e., $t_l(b)$) can be determined compiled, for example, as shown below in Table 2.

TABLE 2

Average Elementary Piece Traversal Time (min/piece)

| | % Grade | | | | | | |
| --- | --- | --- | --- | --- | --- | --- | --- |
| | −20 | −18 | −16 | −14 | −12 | −10 | −8 |
| Cat 5 | 0.0083 | 0.0083 | 0.0083 | 0.0083 | 0.0083 | 0.0083 | 0.0083 |
| Cat 4 | 0.0080 | 0.0080 | 0.0080 | 0.0080 | 0.0080 | 0.0080 | 0.0080 |
| Cat 3 | 0.0075 | 0.0075 | 0.0075 | 0.0075 | 0.0075 | 0.0075 | 0.0075 |
| Cat 2 | 0.0072 | 0.0072 | 0.0072 | 0.0072 | 0.0072 | 0.0072 | 0.0072 |
| Cat 1 | 0.0068 | 0.0068 | 0.0068 | 0.0068 | 0.0068 | 0.0068 | 0.0068 |

| | % Grade | | | | | | |
| --- | --- | --- | --- | --- | --- | --- | --- |
| | −6 | −4 | −2 | 0 | 2 | 4 | 6 |
| Cat 5 | 0.0083 | 0.0107 | 0.0150 | 0.0188 | 0.0221 | 0.0313 | 0.0536 |
| Cat 4 | 0.0080 | 0.0096 | 0.0139 | 0.0179 | 0.0214 | 0.0288 | 0.0469 |
| Cat 3 | 0.0075 | 0.0094 | 0.0125 | 0.0170 | 0.0208 | 0.0268 | 0.0417 |
| Cat 2 | 0.0072 | 0.0087 | 0.0117 | 0.0150 | 0.0197 | 0.0250 | 0.0375 |
| Cat 1 | 0.0068 | 0.0083 | 0.0107 | 0.0150 | 0.0188 | 0.0234 | 0.0313 |

| | % Grade | | | | | | |
| --- | --- | --- | --- | --- | --- | --- | --- |
| | 8 | 10 | 12 | 14 | 16 | 18 | 20 |
| Cat 5 | 0.0625 | 0.0750 | 0.0833 | 0.0882 | 0.0938 | 0.1071 | 0.1250 |
| Cat 4 | 0.0536 | 0.0625 | 0.0682 | 0.0714 | 0.0750 | 0.0938 | 0.1014 |
| Cat 3 | 0.0469 | 0.0536 | 0.0500 | 0.0517 | 0.0625 | 0.0682 | 0.0833 |
| Cat 2 | 0.0417 | 0.0469 | 0.0500 | 0.0517 | 0.0536 | 0.0625 | 0.0721 |
| Cat 1 | 0.0341 | 0.0375 | 0.0417 | 0.0441 | 0.0469 | 0.0536 | 0.0625 |

Similarly, a weight is assigned to each elementary piece, related to its percent grade incline and the amount of perceived exertion experienced by a cyclist (or other form of traveler) when traversing. Weight assignments may be based on information gathered from cycling (or other forms of travel) experts and reflect differences in the perceived exertion level of travelers at various percent grade inclines. For example, category 1 cyclists always perceive downhill inclines as less strenuous than uphill inclines, while cyclists in lower categories perceive extremely steep inclines as more strenuous, due to the energy required to brake. Similarly, perceived exertion for other forms of traversing terrain, such as hiking, varies depending on the incline and the skill level of the traveler. An example of the standard elementary piece weighting scheme and values of perceived exertion for each category of cyclists (e.g., $w_f(b)$) is shown in Table 3.

TABLE 3

Elementary Piece Weights by Category and Grade

| | % Grade | | | | | | |
|---|---|---|---|---|---|---|---|
| | −20 | −18 | −16 | −14 | −12 | −10 | −8 |
| Cat 5 | −0.0693 | −0.0695 | −0.0697 | −0.0700 | −0.0702 | −0.0703 | −0.0701 |
| Cat 4 | −0.0765 | −0.0762 | −0.0759 | −0.0757 | −0.0755 | −0.0753 | −0.0751 |
| Cat 3 | −0.0814 | −0.0812 | −0.0809 | −0.0806 | −0.0804 | −0.0802 | −0.0801 |
| Cat 2 | −0.0816 | −0.0814 | −0.0811 | −0.0808 | −0.0805 | −0.0803 | −0.0801 |
| Cat 1 | −0.0820 | −0.0817 | −0.0815 | −0.0812 | −0.0808 | −0.0805 | −0.0802 |

| | % Grade | | | | | | |
|---|---|---|---|---|---|---|---|
| | −6 | −4 | −2 | 0 | 2 | 4 | 6 |
| Cat 5 | −0.0700 | −0.0300 | −0.0001 | −0.0001 | 0.0272 | 0.0600 | 0.0762 |
| Cat 4 | −0.0750 | −0.0402 | −0.0001 | −0.0001 | 0.0211 | 0.0600 | 0.0650 |
| Cat 3 | −0.0800 | −0.0402 | −0.0001 | −0.0001 | 0.0199 | 0.0600 | 0.0650 |
| Cat 2 | −0.0800 | −0.0500 | −0.0002 | −0.0001 | 0.0128 | 0.0430 | 0.0550 |
| Cat 1 | −0.0800 | −0.0600 | −0.0002 | −0.0001 | 0.0128 | 0.0430 | 0.0500 |

TABLE 3-continued

Elementary Piece Weights by Category and Grade

| | % Grade | | | | | | |
|---|---|---|---|---|---|---|---|
| | 8 | 10 | 12 | 14 | 16 | 18 | 20 |
| Cat 5 | 0.0763 | 0.0764 | 0.0765 | 0.0767 | 0.0770 | 0.0774 | 0.0776 |
| Cat 4 | 0.0651 | 0.0652 | 0.0656 | 0.0660 | 0.0662 | 0.0666 | 0.0669 |
| Cat 3 | 0.0651 | 0.0652 | 0.0654 | 0.0656 | 0.0659 | 0.0662 | 0.0664 |
| Cat 2 | 0.0551 | 0.0552 | 0.0553 | 0.0555 | 0.0558 | 0.0560 | 0.0562 |
| Cat 1 | 0.0504 | 0.0505 | 0.0506 | 0.0508 | 0.0509 | 0.0511 | 0.0514 |

In addition to the cyclists' (or traveler of other travel form) traversal time and assigned elementary piece weights based on percent grade incline, the position of an elementary piece b is also a factor when calculating its perceived exertion level. The position of an elementary piece is an important factor when calculating its perceived exertion level, as when cyclists ride (or travelers traverse through other forms of travel) on several elementary pieces of a particular percent grade in succession, they may perceive that the ride becomes harder as they are required to ride on pieces of high percent grade incline or easier as they ride on pieces of low percent grade incline. To account for this phenomenon, each elementary piece of a given grade is also assigned a weight adjustment (e.g., $a_f(b)$) to be added when it lies within a collection of consecutive pieces with the same percent grade incline. Weight adjustments for elementary pieces of given percent grade by cycling category are shown below in Table 4.

TABLE 4

Elementary Piece Weight Adjustments by Category and Grade

| | % Grade | | | | | | |
|---|---|---|---|---|---|---|---|
| | −20 | −18 | −16 | −14 | −12 | −10 | −8 |
| Cat 5 | −4.428E−06 | −4.408E−06 | −4.388E−06 | −4.368E−06 | −4.348E−06 | −4.318E−06 | −4.288E−06 |
| Cat4 | −7.132E−06 | −7.102E−06 | −7.072E−06 | −7.052E−06 | −7.042E−06 | −7.017E−06 | −6.988E−06 |
| Cat 3 | −3.132E−06 | −3.103E−06 | −3.092E−06 | −3.073E−06 | −3.063E−06 | −3.053E−06 | −3.032E−06 |
| Cat 2 | −4.090E−06 | −4.073E−06 | −4.060E−06 | −4.030E−06 | −3.985E−06 | −3.974E−06 | −3.954E−06 |
| Cat 1 | −3.630E−06 | −3.600E−06 | −3.581E−06 | −3.561E−06 | −3.541E−06 | −3.521E−06 | −3.510E−06 |

| | % Grade | | | | | | |
|---|---|---|---|---|---|---|---|
| | −6 | −4 | −2 | 0 | 2 | 4 | 6 |
| Cat 5 | −4.279E−06 | −3.655E−06 | −1.295E−06 | −2.965E−08 | 6.038E−08 | 7.005E−08 | 7.504E−08 |
| Cat4 | −6.980E−06 | −2.552E−06 | −2.233E−06 | −4.279E−08 | 2.322E−08 | 9.219E−08 | 2.158E−06 |
| Cat 3 | −3.022E−06 | −4.245E−06 | −9.125E−07 | −6.760E−10 | 6.455E−08 | 6.546E−08 | 3.423E−06 |
| Cat 2 | −3.943E−06 | −2.943E−06 | −1.943E−06 | −4.093E−08 | 5.003E−08 | 4.002E−07 | 4.086E−06 |
| Cat 1 | −3.503E−06 | −2.410E−06 | −2.403E−06 | −2.902E−08 | 1.304E−07 | 4.021E−07 | 6.984E−06 |

| | % Grade | | | | | | |
|---|---|---|---|---|---|---|---|
| | 8 | 10 | 12 | 14 | 16 | 18 | 20 |
| Cat 5 | 8.540E−08 | 9.504E−08 | 1.050E−07 | 1.305E−07 | 1.505E−07 | 1.705E−07 | 1.905E−07 |
| Cat 4 | 2.168E−06 | 2.178E−06 | 2.198E−06 | 2.218E−06 | 2.232E−06 | 2.252E−06 | 2.272E−06 |
| Cat 3 | 3.433E−06 | 3.442E−06 | 3.464E−06 | 3.484E−06 | 3.514E−06 | 3.534E−06 | 3.564E−06 |
| Cat 2 | 4.099E−06 | 4.109E−06 | 4.131E−06 | 4.151E−06 | 4.161E−06 | 4.191E−06 | 4.221E−06 |
| Cat 1 | 6.998E−06 | 7.010E−06 | 7.030E−06 | 7.050E−06 | 7.070E−06 | 7.100E−06 | 7.130E−06 |

Perceived Exertion of an Arc:

The PE level of arc a, $h_l(a)$, for a given cycling category, l, (l=1, ... , 5), is calculated as the sum of the PE level of its k elementary pieces:

$$h_l(a) = \sum_{i=1}^{k} h_l(b_i)$$

Perceived Exertion of a Path:

The PE level of path p, $h_l(p)$, for a cycling category, l, (l=1, ... ,5), is calculated as the sum of the PE of its c consecutive arcs:

$$h_l(p) = \sum_{i=1}^{c} h_l(a_i)$$

The method of calculating PE of a path for cyclists of different levels of expertise presented above was tested and validated as an appropriate measure of PE and may be similarly employed to calculate PE of a path for various forms of travel which cause differing levels of perceived exertion depending on incline and/or skill level of the traveler, including for example, hiking, jogging, even driving all-terrain or other vehicles, as well as many other forms of travel, as will readily be understood by those skilled in the relevant fields.

Optimizing a Travel Route for Least Perceived Exertion:

As provided by the present disclosure, the level of PE in traversing any elementary piece can be determined based on traveler skill level and the degree of incline. The level of PE in traversing any arc can be determined by summing the levels of PE in traversing the component elementary pieces of the arc, and the level of PE for any given travel route can be determined by summing the PE levels of each arc in the travel route. As such, a travel route for a traveler having a particular skill level may be optimized for minimal perceived exertion by selecting the path, among other possible paths, between starting and ending points that is composed of arcs having the lowest total level of perceived exertion for those having the traveler's skill level. Known algorithms, such as the label correcting algorithm described by Ahuja for solving shortest path problems on graphs (Ahuja, R. K., Magnanti, T. L., and Orlin, J. B. (1993). Network Flows: Theory, Algorithms, and Applications. Prentice Hall, Inc.), may be adapted and utilized for optimizing based on perceived exertion.

Further, a new form of map may be developed for any geographic area, based on the techniques provided by this disclosure, which indicates levels of perceived exertion associated with segments (e.g., elementary pieces, arcs and/or paths) connecting location points on the map. The map may indicate levels of perceived exertion instead of, or in addition to, distances between points, contour lines or other indicia traditionally included on maps. Such a map may be based on a topographical graph as described herein, with nodes indicating points along a traversable road or trail having a change in incline, and with perceived exertion being determined based on incline and skill level, as described herein. Additionally or alternatively, such a map may be based on any map data from which the incline of a segment may be determined, with the perceived exertion being determined based on incline and skill level as described herein.

FIG. 12 is a schematic illustration of a system for providing a topographical graph 10, in accordance with an embodiment provided by the present disclosure. The system for providing a topographical graph 10, which may also be referred to as 'system 10', includes a topographical graph application 25, electronically accessible over at least one network system 12 and hosted at least partially on a server 20. At least one user computer device 30 is positioned to access the topographical road map application 25.

The server 20 may be or include any database capable of storing and/or providing access to information, such as an electronic database, a computer and/or computerized server, database server or generally any network host capable of storing data and connected to any type of data network. Further, the server 20 may include or be a part of a distributed network or cloud computing environment. Any type of electronic and/or computerized device that is capable of storing information may be included as the server 20, and is considered within the scope of this disclosure. The server 20 may include computer-readable storage media, and a processor for processing data and executing algorithms, including any of the processes and algorithms set forth in this disclosure. The topographical graph application 25 is electronically accessible over at least one network system 12. The network system 12 may include any type of network infrastructure, such as the Internet, or any other wired, wireless and/or partially wired network. The server 20, application 25 and network system 12 may include a variety of hardware and software components to provide successful functioning of the server 20 and the application 25, as is well-known within the art. Further, any features, characteristics, designs and/or functions that are known within the art may be included with the system 10 to further enhance its efficiency.

The user computer device 30 may be any computer device that is capable of communicating with the application 25, for example via a network system 12, and may be operated by any person using the system 10, or any representative thereof. Any number of user computer devices 30 may use the system 10 at any given time. The user computer device 30 may access the application 25 through a variety of ways, including through a computerized device in communication with the system 10 over a network system. For example, the user computer device 30 may be any computer, including any personal computer, Internet appliance, hand-held device (including palmtop computers, wearable computers, cellular or mobile phones, multi-processor systems, processor-based or programmable consumer electronics, network computers, minicomputers) and the like. One or more input devices, such as a keyboard, mouse, microphone, touchscreen interface or the like, may be used to transmit information to and/or request information from the application 25 by the user computer device 30.

The topographical graph application 25 may be fully or partially hosted on the server 20. The topographical graph application 25 may include any tool, device, system, process or combination thereof, which receives input information (e.g., current location, start and end points for a desired travel plan, etc.) from a user and provides users with a topographical graph and/or a travel route based on the provided topographical graph. For example, the application 25 may receive a desired starting and ending point for a travel plan from a traveler using device 30, and constructs a topographical graph and provides an optimized travel route access to the traveler using device 30. The application 25 may include any computer-readable memory or databases, which may be stored in any computer-readable medium, and may be accessible by a computer processor. The application 25 may further include or access computer program instructions which may cause a processor to perform any algorithms and/or functions which may be described in this disclosure.

The system 10 further includes a road map database 24. The application 25 has access to the road map database 24, which may be fully or partially hosted on the server 20, or may be hosted elsewhere and otherwise accessible to the application 25. The road map database 24 stores information associated with road maps of a geographic area. As used herein, "road map" generally means any map indicating, or from which an indication may be extrapolated, distances along roads, trails or any other traversable path within a geographic area. The road map database 24 may be a third-party provided or publicly-accessible database including polyline data, such as available through OpenStreetMap (OSM). Further, the road map database 24 may include information indicating locations of rest stops, overnight accommodations and/or potential attractions or points of interest to travelers.

An elevation database 26 is further included in the system 10 and includes elevation data associated with a geographic area. The elevation database 26 may be a third-party provided or publicly-accessible database, such as the Digital Elevation Model (DEM) provided by the U.S. Geological Survey.

The application 25 may include or provide access to a web or network-based software platform, including a graphical user interface or webpage which provides interactive access to the system 10 to a user of a user computer device 30. Alternatively or additionally, a user computer device 30 may include software providing access to the system 10. The topographical graph application 25 may be a web-based application and may require authorization information, such as username and password, before allowing the user to access the application 25. Alternatively, the application 25 may be included on the user computer device 30 (e.g., as any combination of software and hardware, including a processor and computer-readable memory, for performing the algorithms provided by this disclosure). Additionally, the user computer device 30 may include a GPS module for determining a location of the computer device 30, which may be used by the application 25, for example, to update the travel plan or route as the traveler progresses through the planned travel plan or route. The user computer device 30 may be a wearable device, adapted for comfortable fit and use by cyclists, hikers, joggers, all-terrain vehicle users, soldiers or others who use modes of travel over terrain which may cause perceived exertion.

A traveler using the user computer device 30 to access the topographic graph application 25 may thus input a desired starting and ending point for a travel plan. Further, the user may input a skill level (e.g., cycling, hiking or other level of expertise), which may be a defined level (e.g., as with USA cycling categories) or may be generally subjective assessments of skill (e.g., novice, intermediate, expert). The application 25 constructs a topographical graph, as described above (e.g., in FIGS. 2-11 and accompanying discussion). That is, the application 25 may construct a topographical graph, having nodes indicating points along a road or trail where the degree of incline changes, and with arcs between nodes having a substantially same degree of incline. The topographical graph may be constructed using information for the geographic area in the road database 24 with reference to corresponding elevation information stored in the elevation database 26. The constructed topographical graph for any geographic area may be stored in a topographic graph database 28, which may be accessible to users of a user computer device 30.

The application 25 may further generate an optimized travel plan for the traveler, for example, based on minimal perceived exertion. A perceived exertion database 29 may be included in the system 10, which is accessible to the application 25 and may be fully or partially hosted on the server 20 or hosted elsewhere and otherwise accessible to the application 25. The perceived exertion database 29 stores information associating the perceived exertion for travelers of differing skill level when traversing roads having different inclines. For example, the perceived exertion database 29 may store associations between skill and percent grade incline such as provided in Tables 2 through 4, above. Using information stored in the perceived exertion database 29, the application 25 may calculate perceived exertion for the traveler (based on the traveler's input skill level) in traversing various possible elementary pieces and arcs on the topographical graph between the traveler's input starting and ending point. The application 25 may thus generate an optimized travel plan by selecting a travel route having the least perceived exertion between the starting and ending points. Additionally, the application 25 may generate an optimized travel plan with consideration of rest areas, overnight accommodations, points of interest (or to avoid), which may be input by the traveler.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for providing a topographical graph, the method comprising:
   accessing, over a communication network, a database storing road map data associated with a geographic area;
   accessing, over the communication network, a database storing elevation data associated with the geographic area;
   executing instructions via a processor of a user computing device, wherein execution of the instructions by the processor:
      references the elevation data to identify one or more points at which there is a change in incline along roads in the geographic area,
      constructs the topographical graph, the identified points defining nodes in the topographical graph, and arcs between the nodes representing road segments having a constant degree of incline, wherein nodes and arcs of the topographical graph respectively correspond with geographical positions of the identified points at which there is a change in incline and the road segments having a constant degree of incline, and
      identifies a level of perceived exertion for each arc in the constructed topographical graph, wherein the identified level of perceived exertion is based on a user skill level for a mode of travel, the user skill level for the mode of travel having been inputted by the user; and
   providing a selected travel route to the user via a graphical user interface, wherein the selected travel route is selected from a plurality of different possible travel routes between a starting point and an ending point based on a total level of perceived exertion for a set of one or more arcs associated with each travel route.

2. The method of claim 1, further comprising receiving input from the user regarding the starting point and the ending point.

3. The method of claim 2, wherein each arc comprises one or more consecutive elementary pieces, each elementary piece of an arc having a substantially same degree of incline, wherein determining the level of perceived exertion in traversing an arc comprises: determining the level of perceived exertion in traversing each of the elementary pieces of an arc based on: an average time a person having the user skill level for the mode of travel takes to traverse the elementary piece using the mode of travel; a weight of the elementary piece, based on the degree of incline and the user skill level for the mode of travel; and a position of the elementary piece in an ordered set of the consecutive elementary pieces making up the arc; and summing the determined level of perceived exertion for each of the elementary pieces making up the arc.

4. The method of claim 1, further comprising selecting the travel route based on minimal perceived exertion, wherein the selected travel route has the lowest total level of perceived exertion amongst the plurality of different possible travel routes.

5. The method of claim 1, wherein the accessed road map data includes data regarding one or more rest stops, overnight accommodations, and points of interest, and further comprising creating additional nodes for at least one of the rest areas, overnight accommodations, and points of interest.

6. The method of claim 1, wherein the user computing device is wearable.

7. The method of claim 1, wherein constructing the topological graph comprises accessing a topological graph application hosted at least in part at a server over the communication network.

8. The method of claim 7, wherein the server is part of a cloud computing environment.

9. A system for providing a topographical graph, comprising:
  a road map database that stores road map data associated with a geographic area;
  an elevation database that stores elevation data associated with the geographic area; and
  a user computing device hosting a topographical graph application, the topographical graph application executed by a processor to:
    access the road map data stored at the road map database over a communication network,
    access the elevation data stored at the elevation database over the communication network,
    reference the elevation data to identify one or more points at which there is a change in incline along roads in the geographic area,
    construct the topographical graph, the identified points defining nodes in the topographical graph, and arcs between the nodes representing traversable road segments having a substantially constant degree of incline, wherein nodes and arcs of the topographical graph respectively correspond with geographical positions of the identified points at which there is a change in incline and the road segments having a constant degree of incline,
    identify a level of perceived exertion for each arc in the constructed topographical graph, wherein the identified level of perceived exertion is based on a user skill level for a mode of travel, the user skill level for the mode of travel having been inputted by the user, and
    provide a selected travel route to the user via a graphical user interface, wherein the selected travel route is selected from a plurality of different possible travel routes between a starting point and an ending point based on a total level of perceived exertion for a set of one or more arcs associated with each travel route.

10. The system of claim 9, wherein the topographical graph application is remote from at least one of the road map database and the elevation database.

11. The system of claim 9, wherein the topographical application is further executed by the processor to select the travel route based on minimal perceived exertion, wherein the selected travel route has the lowest total level of perceived exertion amongst the plurality of different possible travel routes.

12. The system of claim 11, wherein each arc comprises one or more consecutive elementary pieces, each elementary piece of an arc having a substantially same degree of incline, wherein the application is configured to determine the level of perceived exertion in traversing an arc by: determining the level of perceived exertion in traversing each of the elementary pieces of an arc based on: an average time a person having the user skill level for the mode of travel takes to traverse the elementary piece using the mode of travel; a weight of the elementary piece, based on the degree of incline and the user skill level for the mode of travel; and a position of the elementary piece in an ordered set of the consecutive elementary pieces making up the arc; and summing the determined level of perceived exertion for each of the elementary pieces making up the arc.

13. The system of claim 9, wherein the computerized device further includes a GPS module for determining a location of the computerized device, wherein the topographical graph application is further configured to indicate the determined location of the computerized device with respect to the constructed topographical graph.

14. The system of claim 9, wherein the user computing device is wearable.

15. The system of claim 9, wherein the user computing device constructs the topological graph by accessing a topological graph application hosted at least in part at a server over the communication network.

16. The system of claim 15, wherein the server is part of a cloud computing environment.

17. A non-transitory computer readable medium having embodied thereon executable instructions for performing a method for providing a topographical graph, the method comprising:
  accessing a road map database that is electronically accessible over a communication network, the road map database storing road map data associated with a geographic area;
  accessing an elevation database that is electronically accessible over the communication network, the elevation database storing elevation data associated with the geographic area
  referencing the elevation data to identify one or more points at which there is a change in incline along roads in the geographic area;
  constructing the topographical graph, the identified points defining nodes in the topographical graph, and arcs between the nodes representing traversable road segments having a constant degree of incline, wherein nodes and arcs of the topographical graph respectively correspond with geographical positions of the identified points at which there is a change in incline and the road segments having a constant degree of incline;

identifying a level of perceived exertion for each arc in the constructed topographical graph, wherein the identified level of perceived exertion is based on a user skill level for a mode of travel, the user skill level for the mode of travel having been inputted by the user; and providing a selected travel route to the user via a graphical user interface, wherein the selected travel route is selected from a plurality of different possible travel routes between a starting point and an ending point based on a total level of perceived exertion for a set of one or more arcs associated with each travel route.

* * * * *